US010948291B2

(12) United States Patent
Lins et al.

(10) Patent No.: US 10,948,291 B2
(45) Date of Patent: Mar. 16, 2021

(54) SPIRIT LEVEL HAVING A SPIRIT LEVEL BODY

(71) Applicant: SOLA-Messwerkzeuge GmbH, Goetzis (AT)

(72) Inventors: Alexander Lins, Feldkirch (AT); Roman Laesser, Goetzis (AT); Gerd Stroehle, Feldkirch (AT)

(73) Assignee: SOLA-Messwerkzeuge GmbH, Goetzis (AT)

( * ) Notice: Subject to any disclaimer, the term of this patent is extended or adjusted under 35 U.S.C. 154(b) by 101 days.

(21) Appl. No.: 16/455,896

(22) Filed: Jun. 28, 2019

(65) Prior Publication Data
US 2020/0025565 A1  Jan. 23, 2020

(30) Foreign Application Priority Data

Jul. 18, 2018 (AT) .............. A 50621/2018

(51) Int. Cl.
*G01C 9/28* (2006.01)
(52) U.S. Cl.
CPC ..................... *G01C 9/28* (2013.01)
(58) Field of Classification Search
CPC ....................................................... G01C 9/28
USPC .................................................. 33/347, 379
See application file for complete search history.

(56) References Cited

U.S. PATENT DOCUMENTS

| 3,213,545 A * | 10/1965 | Wright | G01C 9/26 33/347 |
| 3,820,249 A * | 6/1974 | Stone | G01C 9/26 33/347 |
| 3,832,782 A * | 9/1974 | Johnson | G01C 9/28 33/451 |
| 5,940,978 A * | 8/1999 | Wright | G01C 9/28 33/350 |
| 6,029,360 A * | 2/2000 | Koch | G01C 9/28 33/381 |
| 7,552,540 B2 | 6/2009 | Ming | |
| 7,866,055 B2 * | 1/2011 | Zhang | G01C 9/26 33/365 |
| 2006/0248738 A1 * | 11/2006 | Tran | G01C 9/26 33/451 |

(Continued)

FOREIGN PATENT DOCUMENTS

| EP | 0 852 697 | 11/2001 |
| GB | 2 436 432 | 9/2007 |
| GB | 2463084 | 3/2010 |

OTHER PUBLICATIONS

Search Report dated May 2, 2019 in Austrian Application No. A 50621/2018, with English translation thereof.

*Primary Examiner* — George B Bennett
(74) *Attorney, Agent, or Firm* — Wenderoth, Lind & Ponack, L.L.P.

(57) ABSTRACT

A spirit level includes a spirit level body. At least one measurement surface is arranged along the spirit level body, and the spirit level body is formed by a hollow profile member—preferably of rectangular cross-section. The at least one measurement surface extends uninterruptedly along the hollow profile member. At at least one first or second side wall which is preferably formed at a right angle to the measurement surface is at least one opening for insertion of at least one magnet or magnetizable body into the cavity in the spirit level body.

15 Claims, 2 Drawing Sheets

(56) References Cited

U.S. PATENT DOCUMENTS

| | | | | |
|---|---|---|---|---|
| 2006/0283031 A1* | 12/2006 | Ming | ............... | G01C 9/28 33/347 |
| 2008/0301957 A1* | 12/2008 | Vernola | ............... | G01C 9/28 33/371 |
| 2014/0173923 A1* | 6/2014 | Van Bortel | ............... | A47G 1/22 33/379 |
| 2017/0010097 A1* | 1/2017 | Scheyer | ............... | G01C 9/34 |
| 2019/0353481 A1* | 11/2019 | Bernsen | ............... | G01V 3/165 |

\* cited by examiner

SPIRIT LEVEL HAVING A SPIRIT LEVEL BODY

BACKGROUND OF THE INVENTION

The invention concerns a spirit level and a process for the production of the spirit level according to the invention.

Spirit levels are already part of the state of the art and are disclosed for example in U.S. Pat. No. 7,552,540 B2. That spirit level however is not a spirit level having a spirit level body formed by a hollow profile member. By virtue of the open structure such a spirit level body tends more easily to suffer from impurities and is often of a lower degree of stability than a hollow body. The spirit level disclosed in the state of the art admittedly also has magnets arranged on the rear side of the measurement surface, but they are disposed at or on the outside of a profile member, which makes the fixing thereof definitely more complex and also involves problems in regard to stability and durability of the fixing of the magnets.

EP 0 852 697 B1 discloses a hollow profile member which includes the magnets at the inside thereof. They are inserted through the opening cross-section in the longitudinal direction of the hollow profile member, which makes assembly and fixing of the magnets in the interior of the hollow profile member difficult.

Spirit levels are also known in which a magnet is secured to the spirit level body through the measurement surface. In that case the measurement surface is disrupted by a recess or opening in which the magnet is disposed. Impurities can accumulate in such openings or recesses, and in the worst-case scenario that can result in a discrepancy in measurement.

In addition the measurement surface which is interrupted by the magnets can result in damage to the object being measured and measurement inaccuracies if the magnet installation for example projects from the measurement surface or impurities and contamination can accumulate therein.

A general problem in the case of magnetic spirit levels moreover is that the aim is to ensure good adhesion to the object being measured and thus the magnets should be disposed as close as possible to that object. An increase in distance between the magnet and the object being measured reduces the holding force. The greatest problem is thus that there is a technical conflict between a closed or uninterrupted measurement surface and adequate adhesion to the object being measured.

The object of the invention is to avoid the above-described disadvantages and to provide a spirit level which is improved over the state of the art, and a process for the production of a spirit level.

SUMMARY OF THE INVENTION

The spirit level body is formed by a hollow profile member, preferably having a rectangular cross-section, and at least one measurement surface extending uninterruptedly along the hollow profile member. At at least one first or second side wall preferably formed at a right angle to the measurement surface is at least one opening for insertion of at least one magnet or magnetizable body into the cavity in the spirit level body. As a result, it is possible to achieve a closed measurement surface and direct fixing of the magnet or magnetizable body behind that measurement surface in the cavity in the spirit level body. Thus a small distance is achieved between the object to be measured and the magnet. Installation of the magnet or the magnetizable body through the openings provided laterally in the side wall is further simplified. In addition a high level of strength is achieved by a hollow profile member. Furthermore a hollow profile member affords the advantages that the components disposed therein, like for example bubble tubes or also the magnets or magnetizable bodies are closed off from their environment and are thus protected.

If provided at the first side wall is at least one opening for insertion of at least one magnet or magnetizable body and the oppositely disposed second side wall is of a closed configuration in the region opposite the opening then at the same time the stability at the spirit level body is increased. Too many openings reduce the strength of the spirit level body. Furthermore the overall image of the spirit level is not characterized by too many openings, indentations or the like, and that improves the optical impression of the spirit level. In addition, too many openings or recesses, even if they are closed by covers or the like, result in the production of gaps in which impurities and contamination can accumulate.

If provided in the second side wall in the cavity in the hollow profile member in opposite relationship to the at least one opening in the first side wall is a recess for indirectly or directly fixing the at least one magnet or magnetizable body that recess can be used for fixing the magnet or magnetizable body. A positively locking connection and/or a larger surface area can be afforded by the recess in order to be able to better hold or secure the magnet or magnetizable body.

If the at least one magnet or magnetizable body is indirectly or directly held by a magnet holder in the cavity in the hollow profile member, wherein the at least one magnet or magnetizable body or the magnet holder can be inserted through the at least one opening in the first side wall and is connected to the second side wall by way of the recess that provides for simple stable fixing of the magnet in the interior of the hollow profile member. In that case the magnet holder is held by the first side wall and also by the second side wall. The magnet holder prevents the magnet from falling out. It is also provided that the magnet is positioned as close as possible to the measurement surface. In addition increased strength can be achieved on the spirit level body by virtue of the magnet holder. By virtue of its positively locking relationship with the at least one opening in the spirit level body that contributes to the strength of the spirit level body. It is also often difficult to fix magnet or magnetizable bodies in the interior of a hollow profile member, in consideration of accessibility. Furthermore, by virtue of their material properties, magnets cannot be so easily adapted in their shape as for example a magnet holder comprising plastic. In addition the magnet holder can be produced from a plastic which for example is slightly resilient and can thus also be inserted into the opening, with a certain oversize, and can also be retained at the recess, for example as in the case of a clip connection or a pressing-in operation. Therefore the shape and the choice of material of the magnet holder already affords a certain connection which is dimensionally stable, with the spirit level body, and that is supported or can be supported by an additional joining method like for example adhesive or fusing.

If the at least one magnet or magnetizable body is glued in the cavity in the spirit level body that affords a simple connection between the spirit level body and the magnet, magnetizable body or also the magnet holder. Gluing is a quick, easy, inexpensive stable joining method in which different materials can be permanently joined together.

If the magnet holder or the at least one magnet or magnetizable body has a joining surface for connection— preferably adhesively bonding—to the recess, the connection is improved by way of that joining surface. A defined joining surface, for example for adhesively bonding the magnet, magnetizable body or magnet holder can be prepared for example specifically for that joining or connection operation.

If the magnet holder has at least one magnet socket for receiving at least one magnet or magnetizable body the magnet or magnetizable body is held in its position in the cavity in the spirit level body. If the magnet holder or the magnet socket is produced for example by a slightly resilient material the magnet or magnetizable body can be pressed with a certain oversize into that magnet holder or that magnet socket. This therefore affords a firm connection between the magnet socket and the magnet or magnetizable body. Troublesome noise upon transport or when using the spirit level by virtue of a magnet rattling in the interior of the cavity is prevented. In addition the dimensionally stable connection between the magnet socket, the magnet and the spirit level body can achieve improved stability in regard to the entire structure of the spirit level. Precise positioning of the magnet or magnetizable body by the magnet holder also ensures that the magnet can be disposed as closely as possible to the surface to be measured.

If the magnet holder is adapted in a cover portion to the form of the opening in the first side wall, wherein in the installed state of the magnet holder the opening is closed by the cover portion of the magnet holder a closed surface structure is also produced on the spirit level body after installation of the magnet holder. This therefore prevents the ingress of contaminations or impurities or moisture into the interior of the spirit level body. In addition, by virtue of the closed surface, it is still possible to apply for example digital printing which also extends over the cover portion. The oppositely disposed side surface remains closed as the at least one opening is provided only in the first side wall. Accordingly the opposite second side wall generally represents a closed structure. That side surface can therefore also be used for applying printed images for example in the form of digital printing.

The cover portion further provides that a positively locking connection is achieved between the opening and the cover portion and thus also the magnet holder. That contributes to the stability of the overall spirit level. It could happen for example that an impact against the measurement surface could cause the region of the measurement surface under the opening to be pushed into the interior of the cavity. That is prevented by the positively locking connection—formed by the cover portion—.

If the at least one magnet or magnetizable body is positioned in the cavity in the spirit level body directly behind the at least one uninterrupted measurement surface then an optimum holding force is afforded between the magnet and the object to be measured. In addition the measurement surface itself serves as an abutment for the magnet or magnetizable body. The magnet or magnetizable body is thus enclosed between the portion behind the measurement surface in the interior of the cavity, and the magnet holder. The magnet or magnetizable body can therefore no longer move after it has been inserted through the magnet holder behind the measurement surface.

If the at least one opening extends in respect of its height at a maximum over a quarter of the height of the first or second side wall an opening is thus provided which does not have an adverse effect on the overall stability of the spirit level body. In addition there still remains sufficient surface area to be able to apply for example surface printing also at the first side surface (in which the openings are disposed). In addition the side on which the magnets are to be found is defined precisely, in other words made optically clear to the user. If the cover portion of the magnet holder which is in the opening is identified in colour or differs in colour from the rest of the spirit level then the user can immediately see the position of the magnets.

If the depth of the recess extends at a maximum over half of the wall thickness of the first or second side wall then a sufficiently deep recess is provided to be able to make an improvement in the connection to the magnet holder or magnetizable body. On the other hand adequate strength is also achieved in the region of the recess, by virtue of the choice of the depth of the recess. The stability of the spirit level should not be noticeably reduced by the recess. As the region of the recess is filled after assembly of the magnet holder, the magnet or magnetizable body there is generally no reduction in stability.

If the joining surface of the magnet holder or the at least one magnet or magnetizable body has a structuring, the structuring being provided for the connection—in particular adhesive bonding—to the recess that provides an improvement in the holding force between the magnet, magnet holder or magnetizable body and the spirit level. The term structuring is used to mean that the joining surface has for example a certain roughness, coating, shape or structure in order to improve the connection between the joining surface and the recess. In the case of an adhesive bonding it is advantageous for example to generate a surface area which is as large as possible to provide an adequate adhesive area. The surface is achieved for example by roughening it up or by surface structurings like corrugations, grooves or the like at the joining surface.

If the wall thickness between the magnet or magnetizable body and the measurement surface is thinner than the wall thickness of the first or second side wall this provides closer positioning of the magnet or magnetizable body to the object to be measured. The thinning effect at that location, at which the magnetizable body or the magnet is positioned behind the measurement surface, can in that case be at a maximum two thirds of the wall thickness of the first or second side wall. The thinning can also be arranged only in that region where the magnet is disposed. The consequence of this is that the spirit level is not additionally adversely affected in respect of its stability by the reduction in wall thickness.

The following process steps provide a simple and inexpensive process for the production of a spirit level with improvements in regard to durability, magnetic adhesion to objects, stability and appearance:

cutting a spirit level body to size from a hollow profile member—which is preferably of rectangular cross-section—, providing at least one continuous measurement surface on the spirit level body, producing at least one opening and—possibly at least one recess disposed behind same—in at least one side wall of the spirit level body, that is at a right angle to the measurement surface, and inserting at least one magnet or magnetizable body or a magnet holder with at least one magnet or magnetizable body with a joining surface—possibly in the direction of the recess—through the at least one opening.

In addition that process can be improved by the step of assembling the joining surface to the recess by way of a joining method—preferably adhesive. The connection is simplified by adhesive and additional stability is achieved at the spirit level body. In that case insertion of the magnet holder into the spirit level body is effected for example by previously applying the adhesive to the joining surface and then pushing or inserting the magnet holder into the opening.

By virtue of the dimensioning of the magnet holder or the magnet matched to the dimensions of the spirit level body and the corresponding contact portions which are afforded in that way, it is achieved in that case that the adhesive is used precisely where it is also required. When the magnet holder or magnet is inserted or introduced the adhesive is squeezed between the recess and the joining surface (adhesive surface) or appropriately distributed over a large area by the pressure when the magnet holder or magnet is inserted or introduced, and that results in an improvement in the adhesive bond. The adhesive used can be for example fluid adhesive like for example two-component adhesive or other synthetic resins, isocyanate adhesive like superglue or the like. It would also be possible to use an adhesive strip like for example a double-sided adhesive band.

Instead of an adhesive however it is also possible to use another joining agent or another joining procedure. They include for example fusing or ultrasonic welding.

BRIEF DESCRIPTION OF THE DRAWINGS

Further details and advantages of the present invention are described more fully hereinafter by means of the specific description with reference to the embodiments by way of example illustrated in the drawings in which.

DETAILED DESCRIPTION OF THE INVENTION

Figure 1:
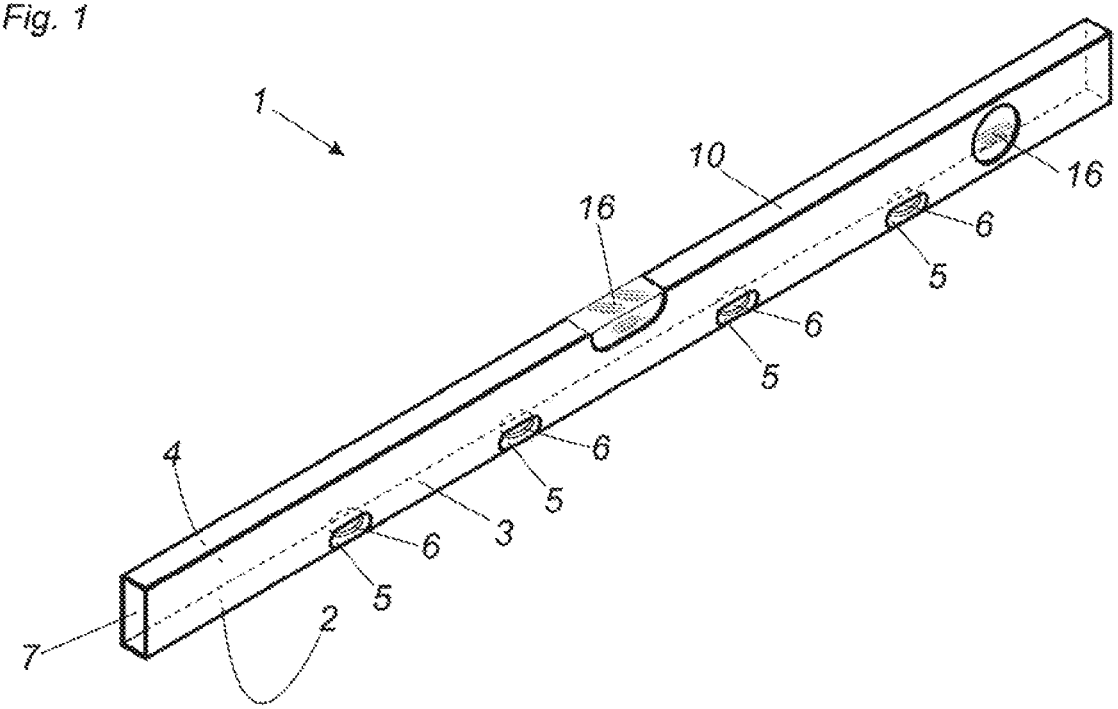
FIG. 1 is a diagrammatic perspective view of an embodiment of a spirit level body with openings.

FIG. 1 shows a spirit level body 10 of a spirit level 1. It has a first side wall 3 and a second side wall 4. Openings 5 can be arranged both in the first side wall 3 and also in the second side wall 4, the openings serving for the insertion of magnets or magnetizable bodies 6. FIG. 1 only shows that openings are disposed at the first side wall 3. Any number of openings 5 can be arranged along the spirit level body 10. In addition it is also possible for at least one or more magnets or magnetizable bodies 6 to be arranged in at least one opening 5 or a plurality of openings 5. The measurement surface 2 is perpendicular to the first or second side wall 3, 4.

The measurement surface 2 does not have any openings or interruptions and preferably extends over the entire length of the spirit level body 10. The measurement surface 2 also remains unaffected by the openings 5. The cavity 7 extends in the interior of the spirit level body 10 as the spirit level body 10 is a hollow profile member. It is preferably of a rectangular cross-section. Other cross-sections would also be conceivable.

In addition at least one bubble tube 16 is arranged in the spirit level 1.

Figure 2:
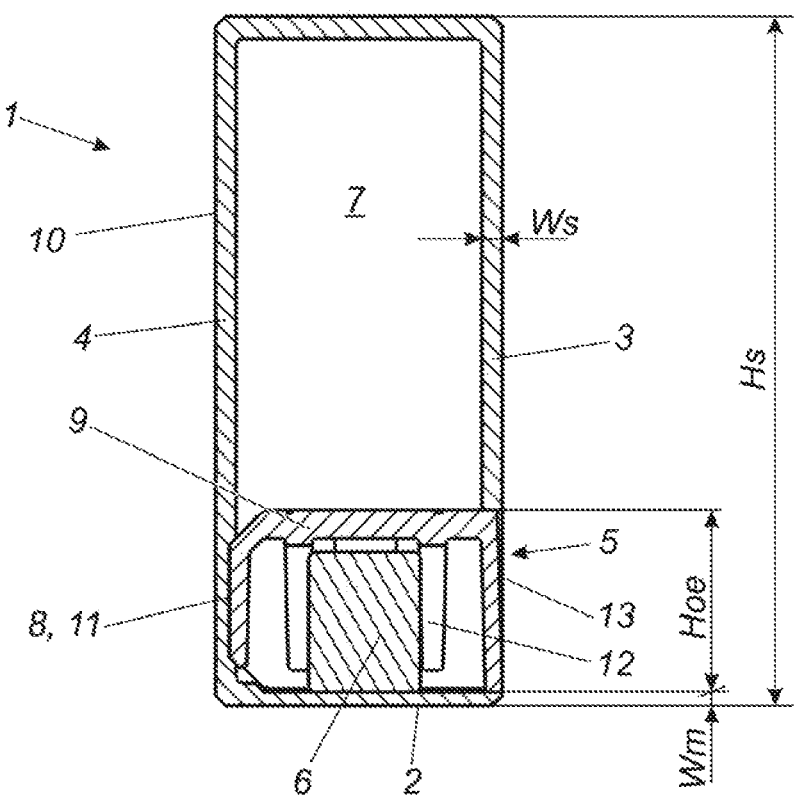
FIGS. 2 and 3 are sectional views through the spirit level.

FIG. 2 shows a cross-section through the spirit level 1 or the spirit level body 10. The magnet holder 9 in the installed condition is disposed in the cavity 7 in the spirit level body 10. It is assembled to the recess 8 by way of the joining surface 11. In that situation the cover portion 13 closes the opening 5 on the spirit level body 10. It will be seen that not only is there a connection used between the joining surface 11 and the recess 8 but there is also a positively locking connection between the spirit level body 10 and the magnet holder 9.

The cover portion 13 is disposed in positively locking relationship in the opening 5 and for example can no longer be moved parallel to the side surfaces 3, 4 or in the direction of the longitudinal axis of the spirit level body 10. It is also apparent that the joining surface 11 engages into the recess 8. Here too a positively locking connection is made.

The magnet holder 9 has a magnet socket 12 provided for positioning the magnet or magnetizable body 6. The magnet or magnetizable body 6 can no longer move by virtue of the inside wall behind the measurement surface 2 in the cavity 7 and the magnet socket 12 in the interior of the cavity 7. It is thus fixedly anchored directly behind the measurement surface 2.

The height of the opening Hoe is in that case at a maximum a quarter of the height Hs of the side wall. The wall thickness of the operative magnetic region Wm is also thinner than the wall thickness Ws of the side wall. That reduces the operative spacing of the magnet 6 in relation to an object to be measured, and that markedly improves the holding force of the spirit level 1. It can also be seen that the height of the opening Hoe only extends from a region above the measurement surface 2 and therefore does not influence same. That provides for adequate strength in the region of the opening 5 and no contamination or impurities can collect in the region of the measurement surface 2.

Figure 3:
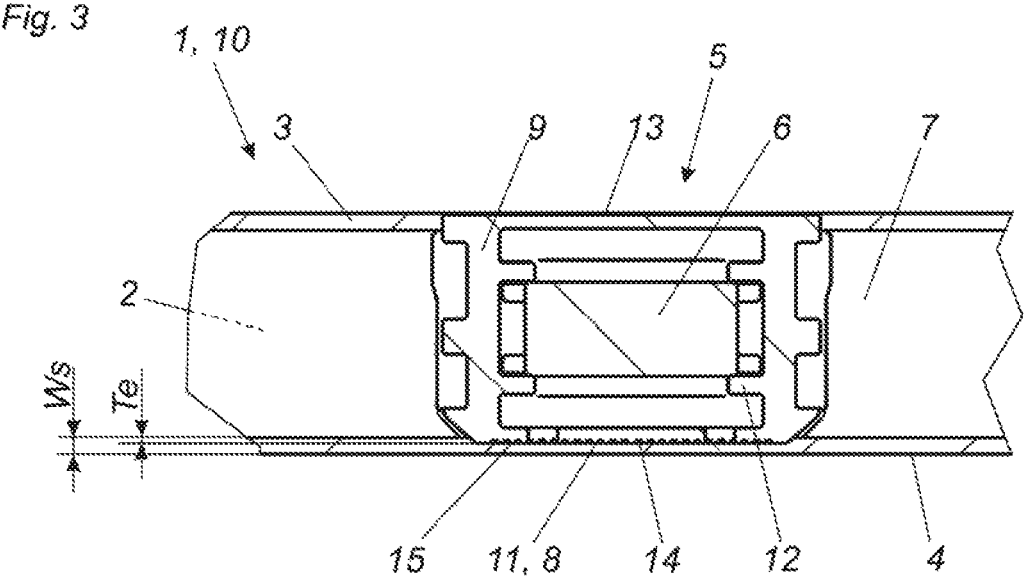

FIG. 3 shows a sectional view through the spirit level body 10 or the spirit level 1 from above perpendicularly on to the measurement surface 2. In that respect it is also possible to see how the cover portion 13 completely closes the opening 5 along the longitudinal axis of the spirit level body 10 and thus involves a positively locking connection. In this arrangement the depth of the recess Te extends into the interior of the wall thickness Ws.

The recess 8 is operatively related to the joining surface 11. Disposed between the joining surface 11 and the recess 8 is a joining agent 15, for example in the form of an adhesive means or the like. If for example an adhesive connection is adopted that can achieve improved adhesion between the magnet holder 9 and the spirit level body 10, by way of a structuring 14.

The structuring 14 can be implemented by simple roughening at the surface of the joining surface 11. The structuring 14 can also be connected to a corresponding structuring at the recess 8. The recess 8 can be created for example by milling or another kind of material removal. It can for example also be provided that the recess 8 is produced at the same time with the opening 5 on the spirit level body 10. That can be permitted for example by a one-off milling operation which machines both side surfaces 3, 4 at the same time from one side.

It can also be provided that the adhesive bond between the joining surface 11 and the recess 8 is effected through passages from the exterior through the magnet holder 9. In that way the adhesive can be injected through the inserted magnet holder 9.

In addition it can be provided that a joining agent 15 is not only used in the region of the joining surface 11 and the recess 8. Additional adhesive bonds can also be used at other locations.

It would also be conceivable that the magnet holder 9 contains not just a magnet or magnetizable body 6 but also other ancillary means like for example a bubble tube. Thus not only the magnet or magnetizable body 6 but also at the same time a bubble tube 16 can be arranged in the spirit level body 1, in one working operation.

Figure 4:
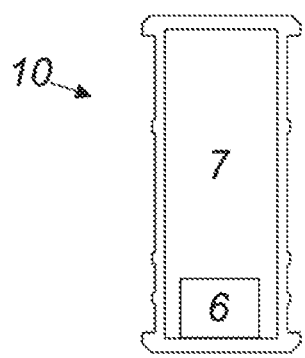
FIGS. 4 to 6 show cross-sections of various configurations of a spirit level body.

FIG. 4 shows a cross-section of a spirit level body 10. In this case the arrangement uses a rectangular profile member having a cavity 7 which at the outside of the profile member has various projections, protrusions or shaped portions thereon. The magnet or magnetizable body 6 is arranged in the interior of the cavity 7, as has already been explained in the foregoing description.

Figure 5:
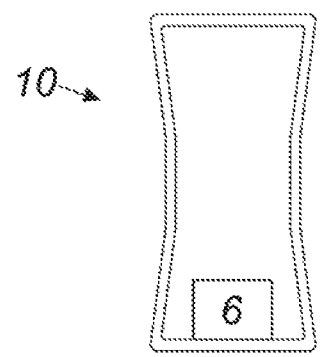

FIG. 5 shows a further embodiment of a spirit level body 10 with hollow body 7 and magnet or magnetizable body 6 disposed therein. The cross-section shown here is not rectangular but polygonal.

Figure 6:
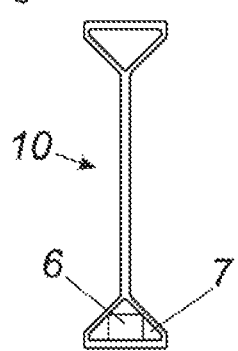

FIG. 6 shows a further embodiment in which the spirit level body 10 has two cavities 7, as is apparent from the cross-section. In this case the magnet or magnetizable body 6 can be arranged in only one or also in both of the cavities 7.

Figure 7:
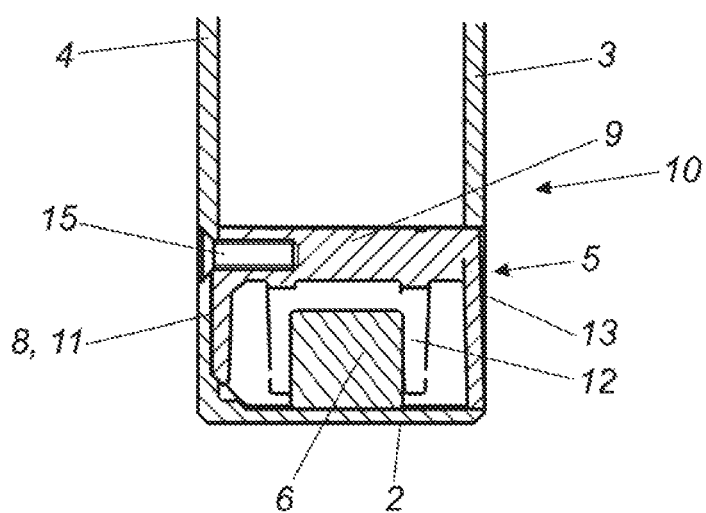
FIG. 7 shows an alternative fixing variant.

FIG. 7 shows a further embodiment of the connection between the magnet holder 9 and the side surface 4 of the spirit level body 10. Instead of or in addition to the adhesive bonding by way of the recess 8 a screw connection can also be made by way of a screw 18. The screw 18 could also make a direct connection between the magnet or magnetizable body 6 and the side wall 4.

LIST OF REFERENCES

1 spirit level
2 measurement surface
3 first side wall
4 second side wall
5 opening
6 magnet or magnetizable body
7 cavity
8 recess
9 magnet holder
10 spirit level body
11 joining surface
12 magnet socket
13 cover portion
14 structuring
15 joining agent
16 screw
Hoe height of opening
Hs height of side wall
Ws wall thickness of side wall
Te depth of recess
Wm wall thickness operative magnetic region

The invention claimed is:

1. A spirit level comprising a spirit level body,
wherein at least one measurement surface is arranged along the spirit level body, wherein
the spirit level body is formed by a hollow profile member, preferably of rectangular cross-section, and
the at least one measurement surface extends uninterruptedly along the hollow profile member, and
provided at at least one first or second side wall which is preferably formed at a right angle to the measurement surface is at least one opening for insertion of at least one magnet or magnetizable body into the cavity in the spirit level body.

2. The spirit level according to claim 1, wherein provided at the first side wall is at least one opening for insertion of at least one magnet or magnetizable body and the oppositely disposed second side wall is of a closed configuration in the region opposite the opening (5).

3. The spirit level according to claim 1, wherein provided in the second side wall in the cavity in the hollow profile member in opposite relationship to the at least one opening in the first side wall is a recess for indirectly or directly fixing the at least one magnet or magnetizable body.

4. The spirit level according to claim 3, wherein the at least one magnet or magnetizable body is indirectly or directly held by a magnet holder in the cavity in the hollow profile member, wherein the at least one magnet or magnetizable body or the magnet holder can be inserted through the at least one opening in the first side wall and is connected to the second side wall by way of the recess.

5. The spirit level according to claim 4, wherein the magnet holder or the at least one magnet or magnetizable body has a joining surface for connection to the recess, wherein the connection can be produced by an adhesive connection and/or a screw connection.

6. The spirit level according to claim 5, wherein the joining surface of the magnet holder or the at least one magnet or magnetizable body has a structuring, the structuring being provided for the connection to the recess.

7. The spirit level according to claim 4, wherein the magnet holder has at least one magnet socket for receiving at least one magnet or magnetizable body.

8. The spirit level according to claim 4, wherein the magnet holder is adapted in a cover portion to the form of the opening in the first side wall, wherein in the installed state of the magnet holder the opening is closed by the cover portion of the magnet holder.

9. The spirit level according to claim 3, wherein the depth of the recess extends at a maximum over half of a wall thickness of the first or second side wall.

10. The spirit level according to claim 1, wherein the at least one magnet or magnetizable body is glued and/or screwed in the cavity in the spirit level body.

11. The spirit level according to claim 1, wherein the at least one magnet or magnetizable body is positioned in the cavity in the spirit level body directly behind the at least one uninterrupted measurement surface.

12. The spirit level according to claim 1, wherein the at least one opening extends in respect of its height at a maximum over a quarter of the height of the first or second side wall.

13. The spirit level according to claim 1, wherein a wall thickness between the magnet or magnetizable body and the measurement surface is thinner than a wall thickness of the first or second side wall.

14. A process for the production of the spirit level according to claim 1, comprising:
cutting a spirit level body to size from a hollow profile member, which is preferably of rectangular cross-section,
providing at least one continuous measurement surface on the spirit level body,
producing at least one opening and—possibly at least one recess disposed behind same—in at least one side wall of the spirit level body, that is at a right angle to the measurement surface, and
inserting at least one magnet or magnetizable body or a magnet holder with at least one magnet or magnetizable body with a joining surface—possibly in the direction of the recess—through the at least one opening.

15. The process according to claim 14, further including assembling the joining surface to the recess by way of a joining method—preferably adhesive and/or screwing.

\* \* \* \* \*